United States Patent
Ben-Itzhak et al.

(10) Patent No.: US 9,697,009 B2
(45) Date of Patent: *Jul. 4, 2017

(54) METHOD FOR IMPROVING THE PERFORMANCE OF COMPUTERS

(71) Applicant: AVG Netherlands B.V., Amsterdam (NL)

(72) Inventors: Yuval Ben-Itzhak, Prague (CZ); Tibor Schiemann, Darmstadt (DE)

(73) Assignee: AVG Netherlands B.V., Amsterdam (NL)

(*) Notice: Subject to any disclaimer, the term of this patent is extended or adjusted under 35 U.S.C. 154(b) by 0 days.

This patent is subject to a terminal disclaimer.

(21) Appl. No.: 14/661,685

(22) Filed: Mar. 18, 2015

(65) Prior Publication Data

US 2015/0193240 A1 Jul. 9, 2015

Related U.S. Application Data

(63) Continuation-in-part of application No. 12/913,858, filed on Oct. 28, 2010, now Pat. No. 8,990,797, and a continuation-in-part of application No. 12/861,025, filed on Aug. 23, 2010.

(30) Foreign Application Priority Data

Jun. 25, 2010 (EP) .................................. 10167361

(51) Int. Cl.
*G06F 9/44* (2006.01)
*G06F 11/34* (2006.01)

(52) U.S. Cl.
CPC ........ *G06F 9/4406* (2013.01); *G06F 11/3409* (2013.01)

(58) Field of Classification Search
CPC .......................... G06F 9/4401; G06F 9/4406
See application file for complete search history.

(56) References Cited

U.S. PATENT DOCUMENTS

| | | | |
|---|---|---|---|
| 2004/0098622 A1* | 5/2004 | O'Neill | H04L 29/06 713/151 |
| 2007/0162732 A1* | 7/2007 | Diwan | G06F 11/3419 713/1 |

(Continued)

*Primary Examiner* — Charlie Sun
(74) *Attorney, Agent, or Firm* — Kramer Levin Naftalis & Frankel LLP

(57) ABSTRACT

In a method for improving the performance of a computer system by releasing computer resources, a list P of programs installed on a computer system is determined. All relevant extension points EP of the computer system are searched for registered entries. A list A of automatically starting programs is generated by assigning the registered entries at the relevant extension points EP to the installed programs, respectively. The list A of the automatically starting programs is compared with a list S of system-required programs and a list V of used programs. Programs that are not system-required and programs that have not been used for a longer period of time are deactivated and computer resources that have been used by the deactivated programs are released. The deactivation of programs can be done by the user or automatically and can be cancelled when necessary.

15 Claims, 1 Drawing Sheet

(56) References Cited

U.S. PATENT DOCUMENTS

| | | | |
|---|---|---|---|
| 2007/0261030 A1* | 11/2007 | Wadhwa | G06F 11/3476 717/127 |
| 2008/0162579 A1* | 7/2008 | Kaminsky | G06F 9/542 |
| 2008/0163169 A1* | 7/2008 | Alcott | G06F 11/3433 717/120 |
| 2008/0231868 A1* | 9/2008 | Onsen | G06F 3/1204 358/1.1 |
| 2009/0083557 A1* | 3/2009 | Ichikawa | G06F 9/5088 713/310 |
| 2010/0250712 A1* | 9/2010 | Ellison | H04L 41/0233 709/219 |
| 2010/0251263 A1* | 9/2010 | Coelho | G06F 11/3433 719/314 |
| 2011/0099267 A1* | 4/2011 | Suri | G06F 9/4856 709/224 |
| 2011/0167491 A1* | 7/2011 | Ruggerio | G06F 21/552 726/23 |
| 2011/0191754 A1* | 8/2011 | Burugula | G06F 9/00 717/139 |

\* cited by examiner

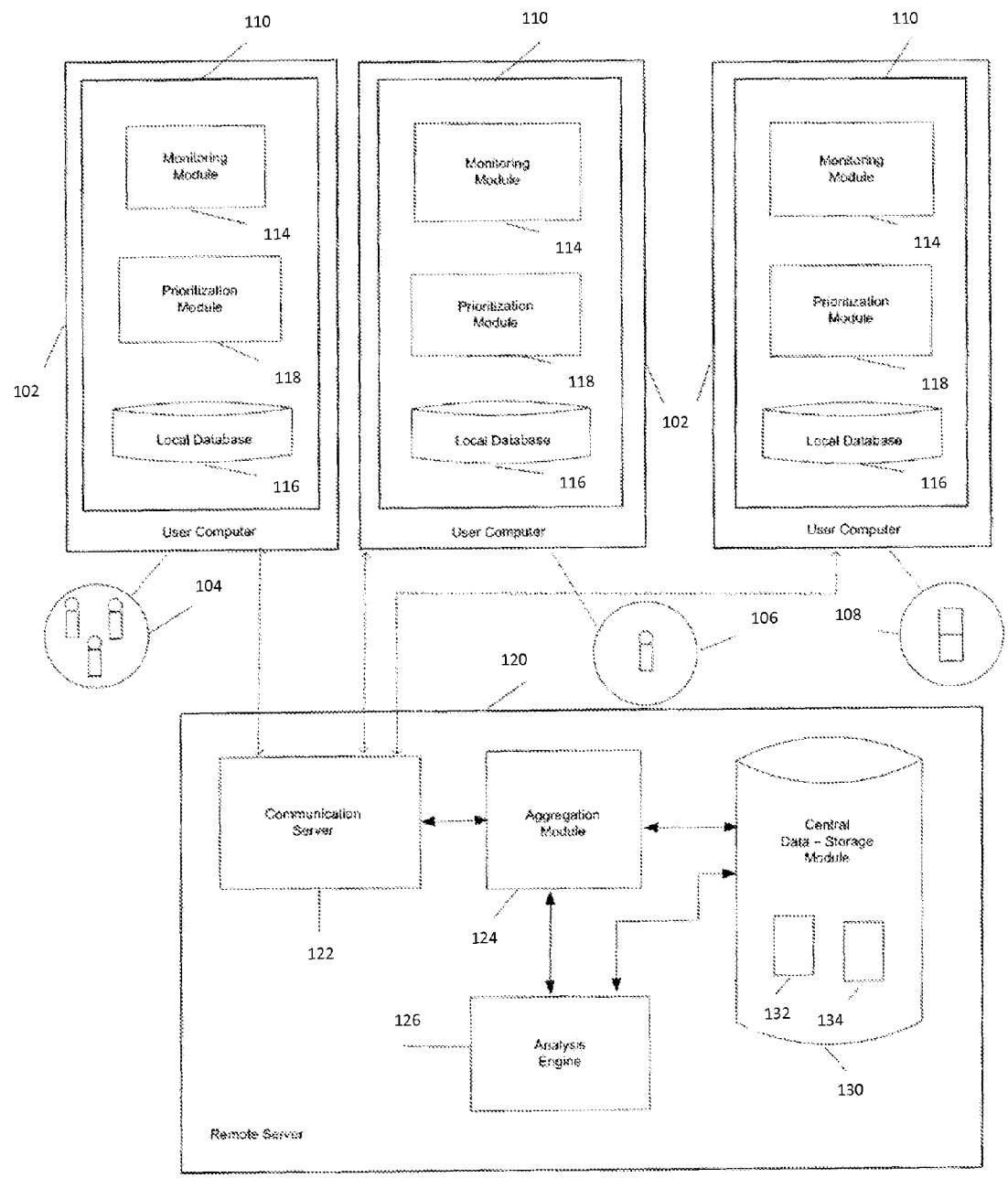

METHOD FOR IMPROVING THE PERFORMANCE OF COMPUTERS

CROSS-REFERENCE TO RELATED APPLICATIONS

This application is a continuation-in-part of U.S. patent application Ser. No. 12/913,858, filed Oct. 28, 2010, which claims priority to European patent application 10 167 361.4, having a filing date of Jun. 25, 2010, the disclosures of which are incorporated by reference herein in their entireties. This application is also a continuation-in-part of U.S. patent application Ser. No. 12/861,025, filed Aug. 23, 2010, the disclosure of which is incorporated by reference herein in its entirety.

FIELD OF THE INVENTION

The invention generally concerns a method for improving the performance of a computer system, in which method resources, such as the main memory or processing time, are released by automatic or user-initiated deactivation of automatically started programs or program parts or programs or program parts running in the background that are however not system-relevant or currently not utilized. These resources are then available for the programs or program parts that are actually being used.

BACKGROUND OF THE INVENTION

The invention concerns a method for improving the performance of a computer system, in which method resources, such as the main memory or processing time, are released by automatic or user-initiated deactivation of automatically started programs or program parts or programs or program parts running in the background that are however not system-relevant or currently not utilized. These resources are then available for the programs or program parts that are actually being used. In the following, performance is to be understood as the overall computing or processing power of a computer system. The user notices the processing power in particular by the speed at which programs and updates of the operating state are processed, like start-up, shut down, restart, and hibernation.

The processing performance of a computer is limited and depends on the hardware (e.g., the processing speed of the processor, the size and speed of the physical main memory and the read/write rate of the hard disk). The available processing performance of the hardware must be shared between all programs running on the computer—a job which is called "multitasking" and is carried out by modern operating systems like Microsoft Windows®. The more programs share in the processing power at the same time, the smaller the proportion of the processing power that is available to each individual program and the longer the response time of the computer for reacting to inputs in a certain program and for processing commands.

If the programs installed on a computer could share the processing power only when the user starts and actually uses these programs, the number of installed programs would have no effect on the speed of a computer. However, in reality it has been found that there is a relationship between the number of installed programs and the speed at which a computer responds and works.

The reason for this is that operating systems like Microsoft Windows® enable programs to link up at certain extension points EP with the processes of the operating system. Many programs register themselves during their installation at one or several of these extension points EP in order to be started automatically by the operating system when certain events occur without the user having to start them manually ("autostart"). The parts of a program automatically started in this manner often continue to run in the background in order to make available certain functionalities to the user or the program ("background functionalities").

As a result of this, programs that have registered themselves for autostart with one or several extension points EP use up the limited processing resources of the computer without any user action (and often without the user even knowing).

In this connection, the following relationships are to be observed:

a) The more programs registered for an autostart during the system start, the longer the system start will take.

b) The more background functionalities running during operation on the computer system, the less computing power is available to the user and his currently used programs.

c) The more background functionalities running at the time when the user gives the command for shutting down the computer, the longer the shutdown will take because the still running background functionalities must be terminated before shutdown.

d) The more background functionalities running at the time when the user gives the command for hibernation mode, the longer it takes to enter into the hibernation mode, because the operating state of the running background functionalities must be transferred from the main memory onto the hard disk.

e) The more background functionalities active at the time when the computer system was switched to hibernation mode, the longer it will take to return the operating state of the system state from the hard disk to the main memory.

Many computers are already delivered by the manufacturer with a huge number of pre-installed programs ("OEM software"; OEM=original equipment manufacturer) which means generally that already at the time of delivery numerous autostarts are registered and numerous background functionalities are operative. From the start, the processing power of these computers is already taxed correspondingly more strongly and the buyer cannot use the full computing power of his hardware.

Moreover, most users over time install additional programs on their computer which results, in turn, in the performance resources being additionally stressed, when these programs register autostarts and provide background functionalities. Users that have little technical experience are therefore under the impression that the performance of their computer decreases more and more over time.

In the past, these problems have been solved in different ways. Often, new hardware was purchased because the user assumed that hardware performance of the existing system was insufficient. Regularly, the operating system was installed anew and some of the programs preinstalled by the hardware manufacturer were eliminated so that an acceleration of the system was achieved. A further possibility resides in uninstalling programs that are not required. This is done advantageously by using uninstall routines provided by the operating system and the program manufacturers (for Windows®: menu icon "software", "add or remove programs" or "programs and functions"—depending on the version of Windows® in the control panel). Uninstall software is also used at times, like the TuneUp Uninstall Manager, Revo Uninstaller or similar solutions. Advanced users manually switch off individual entries registered at the extension points EP, for example, by means of the system configuration program ("msconfig"), the menu icon "Services" in the control panel or the menu item "Scheduled Tasks" or "Task Scheduler" (depending on the version of Windows®) in the control panel of Microsoft Windows®. Tools like "Sysinternals® Autoruns" or "Windows® Defender" can be used also for this purpose. Some commercial software tools permit disabling of software entries at the extension points EP that are not required by most users and that are listed on a list of known entries. This is done, for example, by the software "TuneUp Optimize System Startup and Shutdown."

A disadvantage of most of the aforementioned solutions is that intervention by a user is necessary. Inexperienced users can make the system unstable or inoperative when activating faulty settings.

It is an object of the present invention to free up system resources of a computer system operating under the operating system Windows® (version XP and newer ones) and to improve the performance perceived by the user, in that programs that the user does not need in the actual operating state are deactivated and reactivated when needed.

SUMMARY OF THE INVENTION

According to the invention, this object is solved with a method for improving the performance of computers by release of computer resources that comprises the following steps:

a) determining a list P of the programs installed on the computer system;

b) searching all relevant extension points EP of the computer system for registered entries;

c) generating a list A of automatically starting programs by assigning the registered entries at the relevant extension points EP to the installed programs, respectively;

d) comparing the list A of the automatically starting programs with a list S of system-required programs and a list V of used programs;

e) deactivating programs that are not system-required for the computer and have not been used for a defined period of time and releasing the computer resources that have been used by the deactivated programs.

In some embodiments, information about programs that negatively impact the performance of the computer system may be shared with a centralized database. In the centralized database, multiple individual databases, each received from a community of users, can be aggregated so as to suggest priorities for various applications among groups of users. Because some programs may impact the performance of a computer system more than others, programs that have been determined to negatively impact the performance of computer systems, based on the information received from the community of users, may be prioritized for deactivation. Thus, the computer system can receive a priority list from the centralized database to prioritize which programs should be deactivated. In general, according to the systems and methods of the present invention, some user applications are assigned higher priorities than others based on how negatively they impact the performance of computer systems.

Preferred embodiments of the method are disclosed in the dependent claims and explained in more detail in the following.

BRIEF DESCRIPTION OF THE DRAWING

For a fuller understanding of the inventive embodiments, reference is had to the following description taken in connection with the accompanying FIG. 1, which schematically depicts a centralized application-performance management system including a priority-determination system.

DESCRIPTION OF THE PREFERRED EMBODIMENTS

The term "deactivation" of a program means that all background functionalities of this program are terminated and subsequently all entries associated with this program at the extension points EP are removed or changed in such a way that they are no longer attended to by the operating system.

The "reactivation" of a program means that the initial state of all entries associated with this program at the extension points EP is restored in such a way as if it had never been deactivated and all necessary background functionalities are restarted.

When in the following it is described that lists are compiled or determined or comparisons are carried out or similar processing steps are named, this implies that the results (also partial results) of these steps are saved or are made available in other ways for subsequent processing.

In the method step a) according to the invention, advantageously the list of installed programs that is provided by the Windows® operating system is used for determining the list P of all programs installed on the computer system. Alternatively, or in addition, acquisition of the installed programs is also possible with the aid of the uninstall information that is contained in Windows® system directories.

In the method step b) according to the invention, the search at all relevant extension points EP of the system for entries registered thereat preferably encompasses the autostart section of the Windows® registry, the autostart folder in the start menu, the Windows® services, and the function "Scheduled Tasks" of the control panel. Not only the entries are acquired that are processed during booting up, but also the entries that are processed during the run time of the system (e.g., event-controlled or time-controlled entries). A list of the relevant extension points EP is made available to the method and selected on the basis of the currently found Windows® version.

In the method step c) according to the invention, the combination of both sources of information occurs by means of assigning the entries found at the extension points EP to the respective installed programs of the list P, preferably by querying the local Windows® installer database, the readout of the uninstall keys of the Windows® registry and/or the examination of the version information blocks of all relevant executable files according to product name and manufacturers name. As a result a list A of automatically starting programs is produced. The automatically starting programs can be programs that start event-controlled and/or time-controlled.

In the method step d) according to the invention, the identification of programs that are necessary for the proper and safe function of the system, e.g., security programs, programs required for the use of the hardware (drivers) etc., is carried out by means of a list S in which known programs of this category are listed. This list S is made available to the method within its technical program realization. In addition, dependency information is extracted from the system and the corresponding programs are added to the list S. Such information is found, for example, in the information of installed services in which it is also noted which further services depend on a certain service or from which other services said certain service, in turn, depends.

In some embodiments, the computer system can consult a database (e.g., a local or remote database as described below with respect to FIG. 1) that maintains the list S of system-required programs compiled based on input from individual local computing devices. One benefit of consulting a database compiled in this manner is that some installed programs that appear to be system required may not be required in fact. Thus, if it is determined that a particular program is not a required program for some threshold percentage or number of computing devices, the program may be removed from the list S upon consultation of the database.

Moreover, advantageously an identification of programs that have been used within a certain number of days of use of the computer is also realized. They are entered advantageously in the list V and are protected against an unintentional deactivation. In turn, programs that have not been used for a longer period of time (certain number of days) are recognized. The definition from which point on a program is considered "used" is derived preferably based on whether the program appeared on the monitor for a significant portion of the time during which the user used the computer system—and/or—whether at least one relevant interaction by the user with the program occurred (e.g., input of the user in the program with the keyboard or the mouse). Another criterion can be the interaction of a program with other programs. The default setting in regard to from which duration of utilization on a program is to be considered "used" can be advantageously set by the user.

In the method step e) according to the invention, it is now possible that the user carries out a "deactivation" or "reactivation" of an installed program in order to be able to control the performance loss of the system caused by the program without having to uninstall it. It is also possible to have the method perform "deactivation" or "reactivation" (in the context disclosed above) of an installed program automatically by an appropriate default setting.

In some embodiments, a database may be provided in which deactivation priorities are stored. The database may be located on a local client device associated with an individual user and/or at a remote server. Deactivation priorities may control the order in which programs that are otherwise candidates for deactivation will be deactivated. For example, if a number of installed programs are identified for deactivation in the method disclosed above, those programs may be deactivated in order of their deactivation priorities.

Installed programs identified for deactivation may be deactivated according to the deactivations priorities until all identified programs are deactivated or until some other event occurs such as when the actual or estimated future performance of the computer system reaches a threshold level, for example. The actual performance increase may be measured in real time after each individual program is deactivated whereas the estimated future performance may be calculated based upon historical performance benefits gained by deactivating the program, which may be stored in the local and/or remote database. In this manner, computer system performance can be restored to an acceptable level while reducing the number of deactivated programs.

Deactivation priority databases obtained from other users may be merged within a database located at a remote server, thereby resulting in a centralized deactivation priority database. By performing a statistical analysis of the deactivation-priority database (e.g., computation of the mean and variance of the priorities of the negative performance effects of a particular program), a common deactivation-priority database can be created. In some embodiments, the common deactivation priority database can be distributed to local devices, where it may serve as an initial deactivation-priority database for the local devices.

The remote database can include a centralized application-performance management system having a communications server for receiving several locally-compiled databases from different users. Each database can includes identities of computer applications and/or processes having been executed on local machines and negative performance effects on the local machines associated with those applications. The identities of the computer applications and deactivation priorities are based on negative computer system performance effects, and in some cases stored, on the respective local machines of the various users. The management system also includes an aggregation module for aggregating the locally-compiled databases and a central data storage module for storing the locally-compiled databases and the aggregated database.

FIG. 1 schematically depicts centralized deactivation-priority management system 100, in accordance with some embodiments. Centralized deactivation-priority management system 100, in which some embodiments of the invention may be implemented, includes a deactivation-priority determination system 110. Deactivation-priority determination system 110, residing on a user computer 102, further includes monitoring module 114 that monitors applications being executed on the user's local machine and records the effect of the application on the performance of user computer 102. A user can be individual 106, or a class of individuals associated with each other 104. For example, user 104 can be a group of data-entry operators sharing a common user ID, or a group of individuals having a common job within an organization or company such as doctors sharing a common workstation in a hospital, accountants that use the same computers and/or applications, or teachers. User 108 is a server running applications on the computer 110.

In some embodiments, monitoring module 114 may also identify the user and associate the user's ID with his application usage history. The relationships between various applications (e.g., a web browser invoking a PDF viewer or a video player) may also be observed and recorded by monitoring module 114 in order to allow a common priority to be assigned to different applications. Monitoring module 114 may also identify individual processes associated with the applications as they are executed on the user's local machine. The application-usage data and information regarding the associated processes are stored in local database 116 included in the deactivation-priority determination system 110.

Prioritization module 118 analyzes the usage data and determines a deactivation priority for the application. In general, the more the performance of a computing system is negatively impacted by the application and/or its associated processes, the higher the deactivation priority of that application. Prioritization module 118 may designate the same priority to two or more different applications if it determines that the negative performance effects of those applications are substantially similar.

Centralized system 100 also includes remote server 120 that includes communication server 122. Communication server 122 is configured to receive local databases 116 from different users. Communication server 122 can also receive queries from a user computer 102 requesting a priority for an application. Communication server 122 distributes the model database (described below) and/or the requested priority information to one or more user computers 102.

Aggregation module 124 aggregates the performance data and priority information from the various databases received via communication server 122. In particular, for a certain application, aggregation module 124 may compile a list of priorities obtained from the received databases in which the performance data of that particular application was recorded at various local machines. In addition, aggregation module 124 may compile a data structure containing various types of usage data obtained from the received databases for that application. These aggregated data are stored in an aggregated database 132 contained in the central data-storage module 130.

Analysis engine 126 analyzes the aggregated information generated by the aggregation module 124 and the aggregated usage data from the database 132. Based on the analysis, analysis engine 126 may compile model usage priority database 134. Analysis engine 126 also determines a priority of each application in the received databases, and stores the computed priorities in the model database 134. Statistical methods such as simple averaging, weighted averaging, curve fitting based on the distribution of usage data, etc. may be employed by the analysis engine 126 in compiling model database 134 and in determining the application priorities. Model database 134 may also be stored in the data-storage module 130. Some embodiments provide only a single database that stores the data generated by both the aggregation module 124 and analysis engine 126.

In a preferred embodiment, a visualization of the effects on the system performance that would result upon deactivation of the individual programs registered at the extension points EP is provided. In this connection, advantageously the effects on the system start, on the running system, and on the shutdown are taken into account.

These effects can be displayed cumulatively as well as individually for each program to make the advantages of the deactivation of programs visible and easy to understand. In addition, optionally a grouping to a logical set is realized for the program collections that generate several entries in the list of the installed programs during installation.

Advantageously, an automatic reactivation of a deactivated program occurs when the user tries to execute it in order to avoid that self-repair routines or error messages are triggered. For example, an error message could appear otherwise if a necessary service has been deactivated or cannot be found.

In a preferred embodiment, the automatic reactivation of a deactivated program occurs when the user tries to uninstall it so that in this way errors during uninstall are avoided or errors in deleting files of the program (undeleted files remain) are avoided.

In a preferred embodiment, an automatic reactivation of the program occurs when a program functionality is addressed at an extension point EP, i.e., a request is addressed to the program. For this purpose, the extension points EP are monitored to detect the requests addressed to the deactivated programs. This is done advantageously in that routines are registered at the extension points EP under the name of the original entries of the programs, which routines carry out a reactivation of the deactivated programs, and cache in the interim parameters that are to be passed on and transmit the parameters to the program after reactivation has occurred.

In a preferred embodiment an execution of the inventive method occurs automatically without intervention by the user. Thus, the system can be maintained permanently at optimum performance without manual intervention by the user.

Advantageously, for this purpose the performance of the computer system for the period of utilization is determined regularly and when a drop in performance by a certain amount is detected, the execution of the method is automatically triggered. A performance drop of approx. 10% is generally considered to be recognizable by the user. Therefore, the method is executed preferably when a performance reduction around this value is observed.

Optionally, the user is offered the option of defining an exclusion list of programs that should never be deactivated. Advantageously, all programs that are necessary for the proper and safe function of the computer system are already included here and are excluded from deactivation.

Advantageously a regular and/or automatic check occurs also in regard to whether all of the following criteria are fulfilled for one or several of the installed programs:

i. The program has not been used for a longer period of time (certain number of days) of PC utilization.

ii. The program is not required for the proper and safe function of the computer system.

iii. The program is not on the optional user-defined list of programs that should never be deactivated.

An automatic deactivation of all programs where these criteria apply is then carried out. In a preferred embodiment the user is notified about this action. Advantageously, the indication which programs are to be deactivated or to be reactivated is coupled to the user profile so that different user behaviors or different working tasks of different users are taken into consideration.

Advantageously, the program that executes the inventive method is loaded, preferably automatically, at system startup and is executed and remains active at least in the background up to shutdown of the computer system, i.e., is running during the entire operating period of the computer system. Interactions with the user can be initiated on request by the user, on the basis of system events (for example, inquiry whether a program should be deactivated or be reactivated) or based on time-controlled actions (for example, regular system maintenance).

By means of the inventive method the whole system performance of a computer system remains at a high level for a long period of time. The processing speed of the system is higher. By the release of the main memory space that otherwise would be occupied by background programs it is possible to make available more memory to the actually used programs. Because of the fact that the programs are not loaded, no central processor time is assigned to these programs by the central processor time distribution service (scheduler) and this leads to a quicker execution of the actually used programs. Upgrading or replacement of the hardware components can at least be delayed for some time. The user is not forced to uninstall programs as soon as they are no longer immediately needed. The problems otherwise caused by this, as, for example, incomplete uninstall or unintentional uninstall of still required programs, are avoided in this way. Also, new installation of the operating system can become obsolete in this way. By automatic selection of programs suitable for deactivation the user must not decide himself which entries that are present at different extension points EP are to be deactivated or deleted. Less experienced users can thus also optimize the performance of their computer system. By monitoring the entries at the extension points EP and the automatic reactivation of the entries, the user is not bothered with error messages on account of disabled entries. Especially advantageous is the adaptive character of the method that resides in that the programs not needed by a certain user are deactivated. Advantageously, this information is linked with the user profile of the system so that, depending on the user, the appropriate set of programs is deactivated or activated. Advantageously, deactivations of automatically starting programs whose architecture does permit this become immediately effective. The resources used by these programs are released immediately without requiring a restart of the entire system.

Each functional component described above may be implemented as stand-alone software components or as a single functional module. In some embodiments the components may set aside portions of a computer's random access memory to provide control logic that affects the interception, scanning and presentation steps described above. In such an embodiment, the program or programs may be written in any one of a number of high-level languages, such as FORTRAN, PASCAL, C, C++, C#, Java, Tcl, PERL, or BASIC. Further, the program can be written in a script, macro, or functionality embedded in commercially available software, such as EXCEL or VISUAL BASIC.

Additionally, the software may be implemented in an assembly language directed to a microprocessor resident on a computer. For example, the software can be implemented in Intel 80×86 assembly language if it is configured to run on an IBM PC or PC clone. The software may be embedded on an article of manufacture including, but not limited to, computer-readable program means such as a floppy disk, a hard disk, an optical disk, a magnetic tape, a PROM, an EPROM, or CD-ROM.

The invention can be embodied in other specific forms without departing from the spirit or essential characteristics thereof. The foregoing embodiments are therefore to be considered in all respects illustrative rather than limiting on the invention described herein.

What is claimed is:

1. A method comprising using a processor of a computer system to:
   automatically generate a list of programs that auto-start on a computer system;
   in response to the automatically generated list of programs, automatically compare the list of the programs that auto-start with a list of system-required programs and a list of used programs;
   automatically identify a list of auto-start deactivation candidate programs that are not system-required and have not been used for a defined period of time;
   consult a database comprising deactivation priorities for programs of the list of auto-start deactivation candidate programs;
   deactivate, in order of their respective deactivation priorities identified by the consulting of the database comprising the deactivation priorities, one or more programs in the auto-start list of deactivation candidate programs to release one or more resources of the computer system operating under an operating system and to improve performance of the computer system;
   monitor extension points to detect requests addressed to the deactivated one or more programs; and
   in response to the monitoring extension points, reactivate the deactivated one or more programs.

2. The method of claim 1, further comprising: releasing computer resources that have been used by the deactivated one or more programs.

3. The method of claim 1, wherein the one or more deactivated programs remain deactivated until an actual performance of the computer system improves by a threshold level.

4. The method of claim 1, further comprising at least one of:
   determining a list of programs installed on the computer system; or
   searching relevant extension points of the computer system for registered entries.

5. The method according to claim 4, wherein the relevant extension points comprise at least one of:
   an auto start section of the operating system's registry;
   auto start folders in the operating system's start menu;
   the operating system's services; and
   a scheduled tasks function.

6. The method of claim 1, wherein said automatically generate a list of programs that auto-start comprises: respectively assigning the registered entries at the relevant extension points to the list of programs installed on the computer system.

7. The method according to claim 6, wherein the respectively assigning the registered entries comprises at least one of:
   querying a local operating system's installer databases;
   reading out uninstall keys of the local operating system's registry; or
   querying version information blocks of all relevant executable files according to a product name and a manufacturer's name.

8. The method according to claim 1, further comprising determining a list of programs installed on the computer system by performing at least one of:
   querying the operating system of the computer system; or
   analyzing uninstall information.

9. The method according to claim 1, further comprising: reactivating a deactivated program before performing an uninstall function for the deactivated program.

10. The method according to claim 1, further comprising: caching parameters that are to be passed to one of the deactivated programs; reactivating the deactivated program; and passing the parameters to the reactivated program.

11. The method according to claim 1, further comprising: generating the list of system-required programs by at least one of (i) compiling a list of known system-required programs and (ii) extracting dependency information from the computer system.

12. The method according to claim 1, wherein the deactivating is initiated by a user or initiated automatically.

13. The method according to claim 12, further comprising: providing visualized information to the user regarding effects of the deactivating on the performance of the computer system.

14. The method according to claim 1, wherein the automatically identifying the list of deactivation candidate programs comprises:
   identifying a list of programs that have not been used for a defined number of days;
   identifying the list of system-required programs; and
   identifying a user-defined list of programs not to be deactivated.

15. A computer system, comprising:
   at least one processor;
   a memory containing instructions that, when executed, cause the at least one processor to:
      automatically generate a list of programs that auto-start on the computer system;

in response to the automatically generated list of programs, automatically compare the list of the programs that auto-start with a list of system-required programs and a list of used programs;
automatically identify a list of auto-start deactivation candidate programs that are not system-required and have not been used for a defined period of time; consult a database comprising deactivation priorities for programs of the list of auto-start deactivation candidate programs;
deactivate, in order of their respective deactivation priorities identified by the consulting of the database comprising the deactivation priorities, one or more programs in the list of auto-start deactivation candidate programs to release one or more resources of the computer system operating under an operating system and to improve performance of the computer system;
monitor extension points to detect requests addressed to the deactivated one or more programs; and
in response to the monitoring extension points, reactivate the deactivated one or more programs.

* * * * *